United States Patent [19]
Moseberg et al.

[11] Patent Number: 6,030,124
[45] Date of Patent: Feb. 29, 2000

[54] LINEAR ROLLING BEARING WITH LONGITUDINAL SEALING ELEMENTS

[75] Inventors: Ralf Moseberg, Kindsbach; Frank Scheib, Neunkirchen; Annette Welsch, Homburg, all of Germany

[73] Assignee: INA Walzlager Schaeffler oHG, Germany

[21] Appl. No.: 09/171,348

[22] PCT Filed: Mar. 19, 1997

[86] PCT No.: PCT/EP97/01372

§ 371 Date: Nov. 10, 1998

§ 102(e) Date: Nov. 10, 1998

[87] PCT Pub. No.: WO97/40280

PCT Pub. Date: Oct. 30, 1997

[30] Foreign Application Priority Data

Apr. 20, 1996 [DE] Germany .................. 196 15 791

[51] Int. Cl.[7] ................................. F16C 29/06
[52] U.S. Cl. ............................. 384/15; 384/45
[58] Field of Search ................ 384/45, 44, 43, 384/15

[56] References Cited

U.S. PATENT DOCUMENTS

| | | |
|---|---|---|
| 4,443,017 | 4/1984 | Knott . |
| 4,854,741 | 8/1989 | Mottate et al. ............... 384/45 |
| 5,152,614 | 10/1992 | Albert et al. ................. 384/43 |
| 5,356,223 | 10/1994 | Agari ........................... 384/15 |
| 5,358,336 | 10/1994 | Agari ........................... 384/15 |
| 5,429,439 | 7/1995 | Hsu et al. .................... 384/45 |
| 5,492,343 | 2/1996 | Smith et al. . |
| 5,492,412 | 2/1996 | Tsukada ....................... 384/15 |

FOREIGN PATENT DOCUMENTS

| | | |
|---|---|---|
| 0427238 | 5/1991 | European Pat. Off. . |
| 0594209 | 4/1994 | European Pat. Off. . |
| 3545168 | 6/1987 | Germany . |
| 8816258 | 5/1989 | Germany . |
| 4226607 | 2/1993 | Germany . |
| 9311059 | 11/1993 | Germany . |
| 4311515 | 10/1994 | Germany . |
| 4413373 | 10/1995 | Germany . |

*Primary Examiner*—Thomas R. Hannon
*Attorney, Agent, or Firm*—Bierman, Muserlian and Lucas

[57] ABSTRACT

A linear rolling bearing comprising a fixed guide rail (1) and a guide carriage which has a U-shaped cross-section and partially surrounds the guide rail (1), said guide carriage being slidably mounted on the guide rail (1) while being constituted by a carrier body (2) on whose ends pointing in directions of movement, there are arranged head pieces acting as deflectors for rolling elements and comprising end wipers in contact with the guide rail contour, longitudinal wipers (13) which act as seals and have sealing lips (19) which bear against the guide rail (1) being arranged between the guide carriage and the guide rail (1). According to the invention, an additional sealing lip (20) is formed on each longitudinal wiper (13) and bears against the carrier body (2).

6 Claims, 2 Drawing Sheets

LINEAR ROLLING BEARING WITH LONGITUDINAL SEALING ELEMENTS

This application is a 371 of PCT/EP97/01372 filed Mar. 19, 1997.

DESCRIPTION

1. Field of the Invention

The invention concerns a linear rolling bearing comprising a fixed guide rail and a guide carriage which has a U-shaped cross-section and partially surrounds the guide rail, said guide carriage being slidably mounted on the guide rail while being constituted by a carrier body on whose ends pointing in directions of movement, there are arranged head pieces acting as deflectors for rolling elements and comprising end wipers in contact with the guide rail contour, longitudinal wipers which act as seals and have sealing lips which bear against the guide rail being arranged between the guide carriage and the guide rail.

2. Background of the Invention

In the case of profiled rail guides, the penetration of dirt particles into the bearing region must be prevented in order to maintain the functioning ability of the bearing and this should be accomplished in the smallest possible design space. It is particularly important to prevent dirt particles which have entered the guide despite the end wipers from moving further on to the raceways and into the ball circuits. Damage to the lip of the end wipers can be caused at sharp-edged bores of the guide rail due to a sinking of covering caps or due to improper mounting. Chamfered guide rail bores allow dirt particles to enter the bearing region in spite of the end wipers.

A linear bearing having longitudinal wipers which prevent the penetration of dirt under the guide carriage is known from EP-OS 0 594 209. However, with such a longitudinal seal, there exists the problem that the seal can sag across the length of the carrier body so that dirt can still penetrate into the bearing region. The longitudinal seal is often unstable because it is only made of an elastic plastic. In this prior art, the longitudinal seal is therefore fixed on a rolling element retention web which is screwed to the carrier body by a number of screws. It is further known from EP-OS 0 427 238 to arrange lower longitudinal seals or longitudinal wipers in recesses or depressions of the carrier body with their sealing lips bearing against the guide rail.

A linear rolling bearing of the initially cited type is shown in DE-OS 44 13 373. On each side of the guide rail, the carrier body comprises a detachable carrier body bottom portion which, to assure sealing, requires two longitudinal sealing strips comprising sealing lips.

DE-GM 93 11 059 shows a linear rolling bearing in which sealing lips which prevent the exit of lubricant out of the rolling element region are arranged above the upper rolling element row and under the lower rolling element row on each side of the guide rail between the carrier body and the guide rail. These longitudinal seals are disposed in grooves of the carrier body. The drawback of this, however, is that, due to the grooves in the carrier body, notch effects occur which can have an unfavorable influence.

SUMMARY OF THE INVENTION

The object of the invention is to improve the functioning ability of the linear rolling bearing and reduce the required design space while preventing the occurrence of detrimental notch effects on the carrier body.

This object is achieved according to the invention by the fact that an additional sealing lip is formed on each longitudinal wiper and bears against the carrier body. A reinforcing wire extending over the entire length of the longitudinal wiper can be embedded in each longitudinal wiper. The longitudinal wiper of the invention, for example when used as an upper longitudinal wiper, therefore has two sealing lips: an upper sealing lip which seals against the carrier body of the guide carriage and a lower sealing lip which seals against an upper sealing surface of the guide rail. By this, a penetration of dirt into the bearing region is prevented even in the presence of slight sags of the longitudinal wiper without having to make cost-intensive grooves in the carrier body. The longitudinal wiper is designed so that both the sealing lips are under pre-tension in the installed state.

The longitudinal wiper can extend into the regions of the head pieces where it can comprise recesses in which sub lengths of the reinforcing wire are laid bare. For fixing the longitudinal wiper in the guide carriage, snap hooks can be formed on the deflector dishes of the head pieces into which the bare sub lengths of the reinforcing wire are snapped. Thus, with the help of the sub lengths of the wire, the longitudinal wiper, when used as a lower longitudinal wiper, can be snapped directly into the snap hooks which are situated on the deflector dishes. The deflector dishes are exactly positioned with respect to the raceways of the rolling elements. Besides this, a guide rail groove is ground simultaneously with the raceways. As a consequence, the position of the longitudinal wiper is optimal with respect to the guide rail groove. The position tolerances can be kept to a minimum. A simple and compact fixing of the longitudinal wiper is thus obtained. By an appropriate choice of the sealing lip geometry, it is possible to use the same wiper both for sealing the upper edge of the rail and for sealing in a longitudinal groove of the rail.

In the longitudinal seals configured as upper and lower longitudinal wipers, the embedded reinforcing wire serves to stabilize the seals and can be used at the same time to fix the longitudinal wipers on the carrier body. The lower longitudinal wiper can likewise comprise two sealing lips one of which engages into a groove of the guide rail so that any dirt particles that may be present additionally press the sealing lip against the guide rail and thus enhance the sealing effect. The second sealing lip bears sealingly against the carrier body. Even if the wiper sags, a penetration of dirt into the gap between the carrier body and the wiper is not possible because the wiper is situated in a depression in the carrier body.

The longitudinal wiper can extend up to the two end wipers which, at their junctions with the longitudinal wiper, comprise integrally formed webs. In this way, the gap between the seals is filled.

BRIEF DESCRIPTION OF THE DRAWINGS

The drawings show examples of embodiment of the invention which will be described more closely below.

DETAILED DESCRIPTION OF THE DRAWINGS

Figure 1:
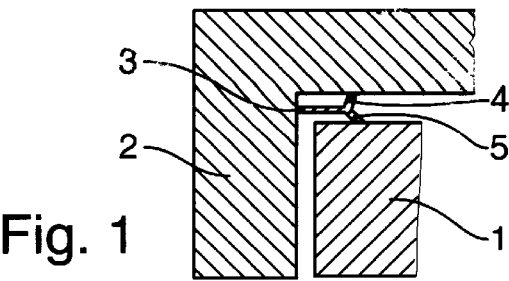
FIG. 1 is a schematic view of a partial cross-section through the linear rolling bearing having an upper longitudinal wiper.
Figure 2:
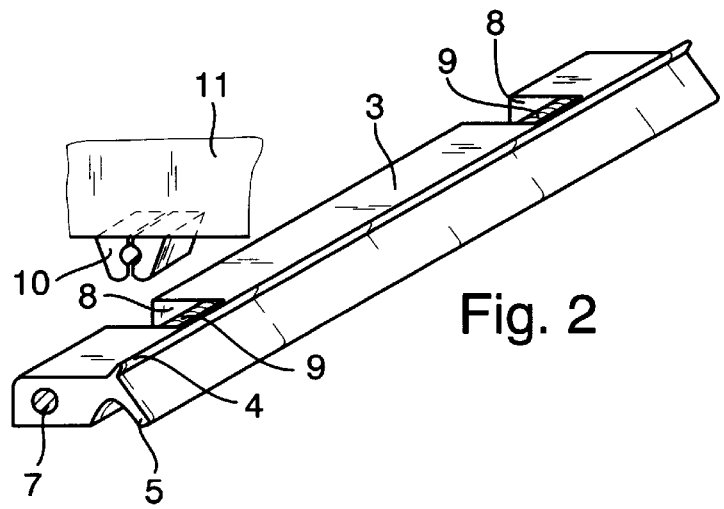
FIG. 2 shows a first embodiment of a longitudinal wiper.
Figure 3:
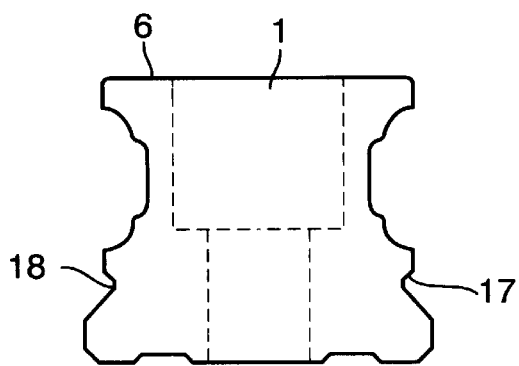
FIG. 3 is an end view of a guide rail.

Between a guide rail 1 of a linear rolling bearing and a carrier body 2 with a U-shaped cross-section surrounding the guide rail 1, there is arranged a sealing element in the form of a longitudinal wiper 3 which, according to FIG. 1, has an upper sealing lip 4 and a lower sealing lip 5. While the lower sealing lip 5 bears sealingly against the upper sealing surface 6 of the guide rail 1, the upper sealing lip 4 is in contact with an inner surface of the carrier body 2. It can be seen in FIG. 2 that a reinforcing wire 7 extending over the entire length of the longitudinal wiper 3 is embedded therein. At two points of its length, the wiper 3 comprises recesses 8 in which sub lengths 9 of the reinforcing wire 7 are laid bare. This enables the longitudinal wiper 3 to be inserted with its sub lengths 9 into snap hooks 10 which are arranged on the two deflector dishes 11 for the rolling elements in the two end regions of the carrier body 2. In this way, the longitudinal wiper 3 is fixed on the deflector dishes 11 and thus on the carrier body 2.

Figure 4:
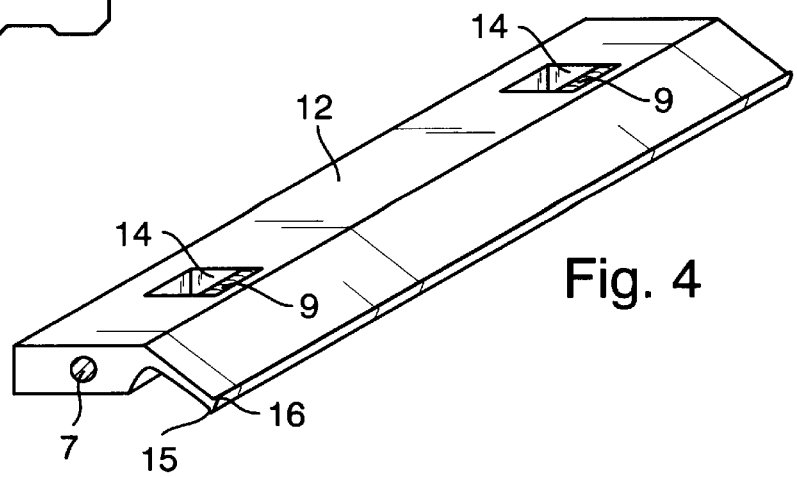
FIG. 4 shows a second embodiment of a longitudinal wiper.
Figure 5:
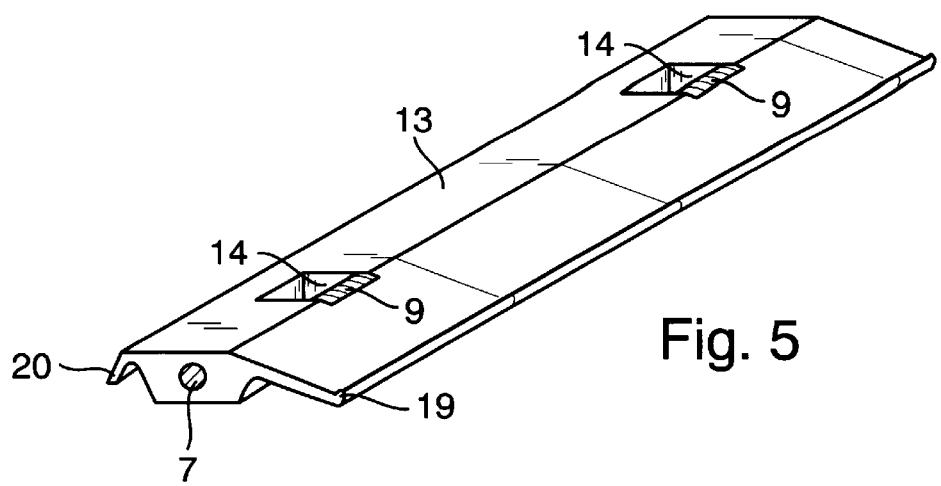
FIG. 5 shows a third embodiment of a longitudinal wiper.
Figure 6:
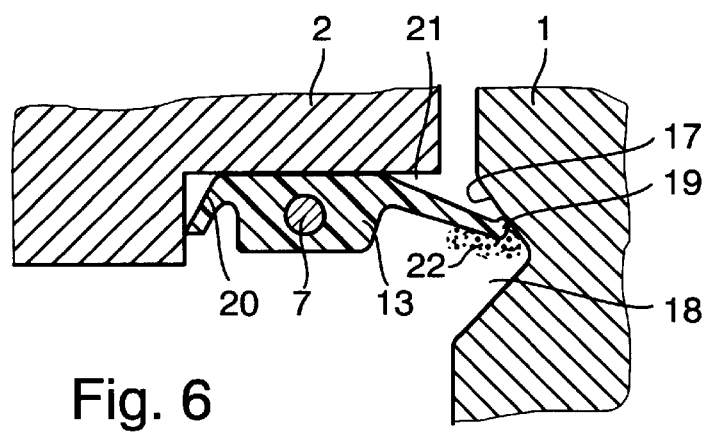
FIG. 6 is a cross-section through the longitudinal wiper of FIG. 5 in the installed state.
Figure 7:
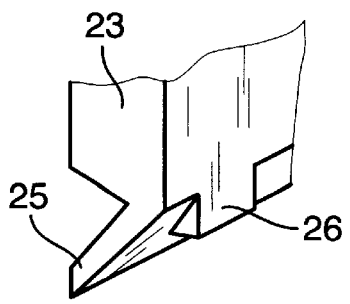
FIG. 7 is a detail of an end wiper.
Figure 8:
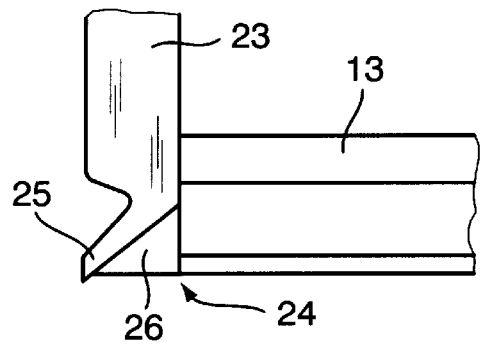
FIG. 8 is a detail of an end wiper and a longitudinal wiper.

The longitudinal wiper 12 of FIG. 4 and the longitudinal wiper 13 of FIGS. 5 and 6 also comprise such sub lengths 9 of the reinforcing wire 7 in recesses 14 to enable fixing. The longitudinal wiper 12 can be used both as an upper and a lower longitudinal wiper. When it is used as an upper wiper, its lower sealing lip 15 bears against the upper sealing surface 6 of the guide rail 1, while, when it is used as a lower wiper, its upper sealing lip 16 bears against a lower sealing surface 17 of the guide rail 1 which is formed within a longitudinal groove 18 of the guide rail 1.

In the case of the longitudinal wiper 13 of FIGS. 5 and 6, a sealing lip is formed on each of its two opposing side walls, viz., a sealing lip 19 for contact with the guide rail 1 and a sealing lip 20 for contact with the carrier body 2. This longitudinal wiper is fixed within a recess 21 of the carrier body 2 with its sealing lip 19 engaging into the longitudinal groove 18 of the guide rail 1 where it bears against the lower sealing surface 17 so that dirt particles 22 cannot penetrate into the bearing region of the linear rolling bearing.

Due to the sealing lip 25 of the end wiper 23, an empty triangular space would be formed in the contact regions of the two end faces of a longitudinal wiper 13 with the end faces of the adjoining end wipers 23 if the end wipers 23 did not comprise an integrally formed web 26 in these regions. This web 26 thus contributes to a reliable sealing of the bearing region of the linear rolling bearing.

List of Reference Numbers

1 Guide rail
2 Carrier body
3 Longitudinal wiper
4 Upper sealing lip
5 Lower sealing lip
6 Upper sealing surface
7 Reinforcing wire
8 Recess
9 Sub length
10 Snap hook
11 Deflector dish
12 Longitudinal wiper
13 Longitudinal wiper
14 Recess
15 Lower sealing lip
16 Upper sealing lip
17 Lower sealing surface
18 Longitudinal groove
19 Sealing lip
20 Sealing lip
21 Recess
22 Dirt particles
23 End wiper
24 Junction
25 Sealing lip
26 Web

We claim:

1. A linear rolling bearing comprising a fixed guide rail (1) and a guide carriage which has a U-shaped cross-section and partially surrounds the guide rail (1), said guide carriage being slidably mounted on the guide rail (1) while being constituted by a carrier body (2) on whose ends pointing in directions of movement, there are arranged head pieces acting as deflectors for rolling elements and comprising end wipers (23) in contact with the guide rail contour, longitudinal wipers (3, 12, 13) which act as seals and have sealing lips (5, 15, 16, 19) which bear against the guide rail (1) being arranged between the guide carriage and the guide rail (1), characterized in that a reinforcing wire (7) extending over an entire length of the longitudinal wiper (3, 12, 13) is embedded in each longitudinal wiper (3, 12, 13), the longitudinal wiper (3, 12, 13) extends into the regions of the head pieces where it comprises recesses (8, 14) in which the reinforcing wire (7) is laid bare, and for fixing the longitudinal wiper (3, 12, 13) in the guide carriage, snap hooks (10) are formed on the head pieces or on deflector dishes (11) of the head pieces into which the bare sub lengths (9) of the reinforcing wire (7) are snapped.

2. A linear rolling bearing according to claim 1, characterized in that the longitudinal wiper (3, 12, 13) extends up to the two end wipers (23) which, at their junctions (24) with the longitudinal wiper (3, 12, 13), comprise integrally formed webs (26).

3. A linear rolling bearing according to claim 1, characterized in that the guide rail (1) comprises two opposing V-shaped longitudinal grooves (18) on whose sealing surfaces (17) the sealing lips (16, 19) of the longitudinal wipers (12, 13) bear sealingly.

4. A linear rolling bearing according to claim 3, characterized in that, when wear occurs in the sealing lips (16, 19) of the longitudinal wipers (12, 13), the V-shaped longitudinal grooves (18) of the guide rail (1) form a labyrinth seal together with the longitudinal wipers.

5. A linear rolling bearing according to claim 1, characterized in that the longitudinal wipers (3, 12, 13) are configured so that the mold parting plane of an injection mold is situated outside of the sealing lip region.

6. A linear rolling bearing according to claim 1, characterized in that the longitudinal wipers (12, 13) are arranged in a recess (21) of the carrier body (2).

* * * * *